United States Patent
Zeng et al.

(10) Patent No.: US 11,526,151 B2
(45) Date of Patent: Dec. 13, 2022

(54) METHOD, APPARATUS, AND DEVICE FOR GENERATING RULED SURFACE MACHINING PATH AND MEDIUM

(71) Applicant: SHANGHAI LIONSTEK CO., LTD., Shanghai (CN)

(72) Inventors: Jiyue Zeng, Shanghai (CN); Shaocheng Sha, Shanghai (CN); Shijin Zhang, Shanghai (CN)

(73) Assignees: YANGTZE RIVER DELTA RESEARCH INSTITUTE OF NPU, Taicang (CN); INSTITUTE OF NPU, Taicang (CN)

( * ) Notice: Subject to any disclaimer, the term of this patent is extended or adjusted under 35 U.S.C. 154(b) by 284 days.

(21) Appl. No.: 16/628,599

(22) PCT Filed: Jan. 10, 2018

(86) PCT No.: PCT/CN2018/072103
§ 371 (c)(1),
(2) Date: Jan. 3, 2020

(87) PCT Pub. No.: WO2019/007018
PCT Pub. Date: Jan. 10, 2019

(65) Prior Publication Data
US 2020/0159187 A1    May 21, 2020

(30) Foreign Application Priority Data
Jul. 5, 2017   (CN) .......................... 201710543378.X

(51) Int. Cl.
*G05B 19/4099*   (2006.01)

(52) U.S. Cl.
CPC ............ *G05B 19/4099* (2013.01); *G05B 2219/35097* (2013.01); *G05B 2219/35146* (2013.01);
(Continued)

(58) Field of Classification Search
None
See application file for complete search history.

(56) References Cited

U.S. PATENT DOCUMENTS

| 4,789,931 A | 12/1988 | Kuragano et al. |
| 8,478,438 B2 * | 7/2013 | Nishibashi ......... G05B 19/4103 700/159 |

(Continued)

FOREIGN PATENT DOCUMENTS

| CN | 101 271 326 | 9/2008 |
| CN | 102 107 295 | 6/2011 |

(Continued)

OTHER PUBLICATIONS

State Intellectual Property Office of the P.R. of China, International Search Report of WO 2019/007 018 from PCT/CN2018/072103, dated Apr. 12, 2018, China.
(Continued)

*Primary Examiner* — Jason Lin
(74) *Attorney, Agent, or Firm* — Emerson Thomson Bennett; Daniel A. Thomson

(57) ABSTRACT

A method, an apparatus and a device for generating a ruled surface machining path, and a medium relate to the field of numerical control machining technologies. The method includes: acquiring each target ruled surface in a three-dimensional diagram of a target workpiece to be machined; generating a mathematical model of each target ruled surface according to each target ruled surface; determining a current machining speed according to the mathematical model and preset machining process parameters; and calculating machining path data corresponding to the target ruled surface according to the current machining speed. The technical problems of large errors and lack of control and compensation on natural defects of "soft knife" machining in the existing ruled surface machining method are solved.

(Continued)

```
Target Ruled Surface Acquisition
Module 410

Mathematical Model Generating
Module 420

Current Machining Speed
Calculation Module 430

Machining Path Data Acquisition
Module 440
```

The beneficial effects of reducing errors of ruled surface machining and improving control and compensation on the natural defects of "soft knife" machining are obtained.

18 Claims, 4 Drawing Sheets

(52) U.S. Cl.
CPC .............. *G05B 2219/35151* (2013.01); *G05B 2219/35167* (2013.01)

(56) References Cited

U.S. PATENT DOCUMENTS

| | | | | |
|---|---|---|---|---|
| 2003/0204285 | A1* | 10/2003 | Thomas | G05B 19/4097 700/182 |
| 2006/0219667 | A1* | 10/2006 | Martin | B23H 7/065 219/69.12 |
| 2007/0046677 | A1* | 3/2007 | Hong | G05B 19/41 345/442 |
| 2009/0248203 | A1* | 10/2009 | Nakamura | G05B 19/4103 700/251 |
| 2010/0292822 | A1* | 11/2010 | Hahn | G05B 19/40937 700/98 |
| 2011/0287692 | A1* | 11/2011 | Erichsen | B24C 1/045 451/5 |
| 2013/0345853 | A1* | 12/2013 | Berman | G05B 19/18 700/186 |
| 2014/0025194 | A1* | 1/2014 | Koide | G05B 19/182 700/187 |
| 2014/0257543 | A1 | 9/2014 | Rhodes et al. | |
| 2015/0362914 | A1 | 12/2015 | DeSimone et al. | |
| 2017/0255184 | A1* | 9/2017 | Henning | F16M 11/18 |
| 2018/0236726 | A1* | 8/2018 | Etcheson | B33Y 10/00 |
| 2019/0086901 | A1* | 3/2019 | Prongue | G05B 19/41 |
| 2019/0250311 | A1* | 8/2019 | Rudolph | G02C 7/086 |

FOREIGN PATENT DOCUMENTS

| | | |
|---|---|---|
| CN | 102 129 232 | 7/2011 |
| CN | 102 794 488 | 11/2012 |
| CN | 102 866 671 | 1/2013 |
| CN | 105 458 372 | 4/2016 |
| EP | 0 996 045 | 4/2000 |
| JP | 2003 44110 | 2/2003 |

OTHER PUBLICATIONS

Abstract translation of foreign patent documents.
Search Report of First Office Action of Chinese patent application No. 2017 1054 3378X.
Ramesh, et al.; Automated Intelligent Manufacturing System for Surface Finish Control in CNC Milling using Support Vector Machines International Journal of Advanced Manufacturing Technology; 2009; 42:1103-1117.
European Patent Office; Extended European Search Report; EP Application No. EP 188 289 32; dated Feb. 18, 2021.

* cited by examiner

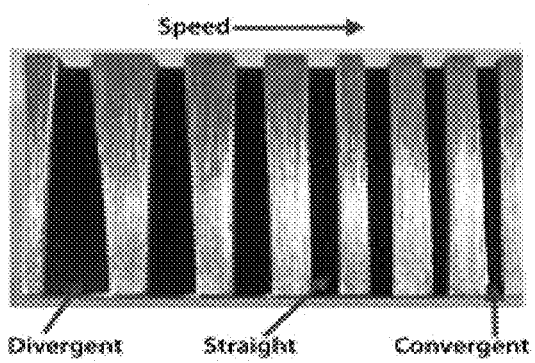
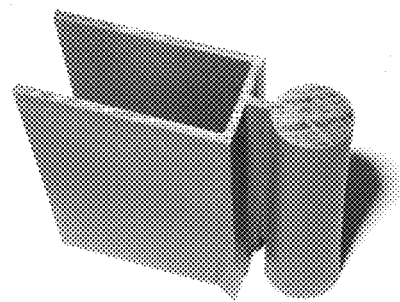
FIG. 2D  FIG. 2E
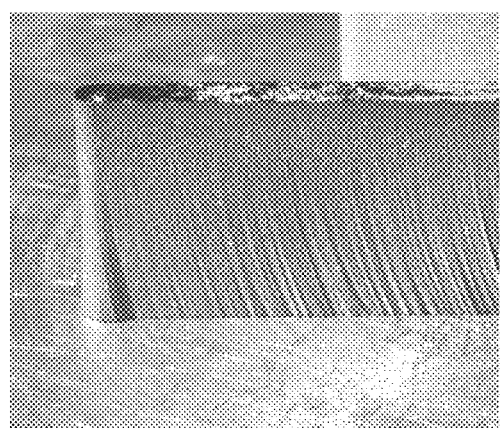
FIG. 2F
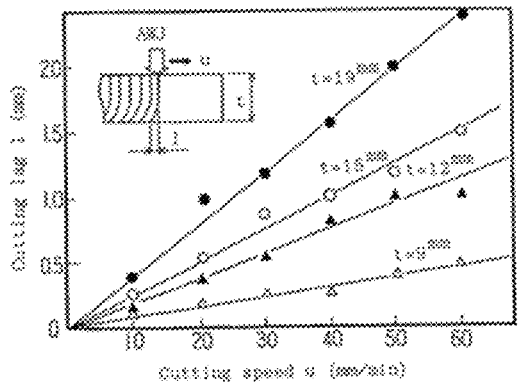
FIG. 2G
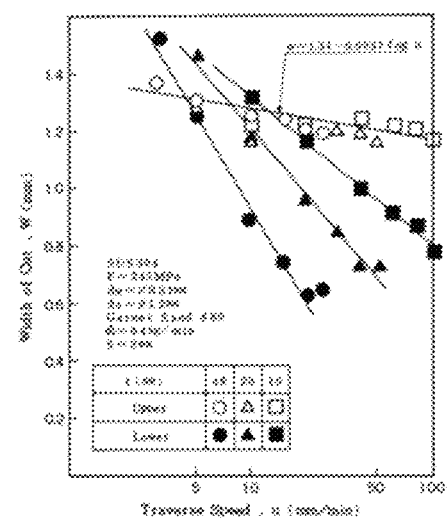
FIG. 2H

METHOD, APPARATUS, AND DEVICE FOR GENERATING RULED SURFACE MACHINING PATH AND MEDIUM

FIELD OF TECHNOLOGY

The disclosure relates to the field of numerical control machining technologies, and more particularly, to a method, an apparatus and a device for generating a ruled surface machining path, and a medium.

BACKGROUND

Numerical control technology is one of the important symbols to measure the machinery manufacturing industry level of one country, and is also an important symbol to reflect the technical level of a machinery manufacturing enterprise. The rapid development of the numerical control technology has brought fundamental changes to traditional mechanical design and manufacturing methods. In particular, the widespread use of modern multi-axis numerical control machine tools, with the aid of computer-aided programming tools, has greatly shortened the manufacturing cycle of products and improved the competitiveness of enterprises. In terms of beam cutters, ruled surface machining may be divided into rigid cutter machining and soft cutter machining. For example, water jet cutting, laser cutting, plasma arc cutting and wire-cut electrical discharge machining (WEDM) all belong to ruled surface machining with a "soft cutter". A milling cutter is a rigid cutter.

In current three-dimensional CAM (Computer Aided Manufacturing) software, the programming of the above-mentioned ruled surface machining with a "soft cutter" is to cut an upper edge curve and a lower edge curve of a machining surface into a series of straight segments (coarse interpolation) after performing sorting and cutter compensation on the machining surface in a three-dimensional diagram of a workpiece, and write a spatial angle of a machining vector at an end point of the straight segment together with coordinates of the end point and a running speed of the machining vector into a line of program code (for example, G code, wherein the G code is an instruction in a numerical control program, which is generally called a G instruction). The code of the whole program is interpolated and calculated in a lower computer (movement controller) of a CNC (Computer numerical control) numerical control system to form a movement command required by each axis of movement.

However, there are still some problems in the application of the current 3D CAM software to the ruled surface machining. Firstly, the continuity of speed and acceleration is destroyed after the originally continuous and smooth curve is cut into a series of straight segments. Moreover, if the length of the straight segment is too long, the error of machining vector movement trajectory will be very large. It is difficult to optimize the machining speed and acceleration in the cutting process. In addition, when a ruled surface is machined with a "soft cutter", the upper and lower contours of the machined part are inconsistent due to the natural defects of the beam cutter, for example, taper errors of cuts, skirt-like errors at corners and arcs due to backward bending of the lower edge of the beam cutter, or barrel-like errors due to backward bending of the middle of the wire cutter during WEDM, etc. However, the traditional NC machining only focuses on rigid cutters and lacks control and compensation for the natural defects of "soft cutter" machining.

SUMMARY

In view of the above problems, the disclosure is proposed so as to provide a method for generating a ruled surface machining path, an apparatus for generating a ruled surface machining path, a corresponding device for generating a ruled surface machining path and a readable medium overcoming the above problems or at least partially solving the above problems.

According to an aspect of the disclosure, there is provided a method for generating a ruled surface machining path, including:

acquiring each target ruled surface in a three-dimensional model diagram of a target workpiece to be machined;

generating a mathematical model of each target ruled surface according to each target ruled surface;

determining a current machining speed according to the mathematical model and preset machining process parameters; and calculating machining path data corresponding to the target ruled surface according to the current machining speed.

According to another aspect of the disclosure, there is provided an apparatus for generating a ruled surface machining path, including:

a target ruled surface acquisition module configured to acquire each target ruled surface in a three-dimensional model diagram of a target workpiece to be machined;

a mathematical model generating module configured to generate a mathematical model of each target ruled surface according to each target ruled surface;

a current machining speed calculation module configured to determine a current machining speed according to the mathematical model and preset machining process parameters; and a machining path data acquisition module configured to calculate machining path data corresponding to the target ruled surface according to the current machining speed.

According to another aspect of the disclosure, there is provided a device for generating a ruled surface machining path, including:

a memory loaded with a plurality of executable instructions; and a processor for executing the plurality of executable instructions; the plurality of executable instructions include a method of executing the following steps:

acquiring each target ruled surface in a three-dimensional model diagram of a target workpiece to be machined;

generating a mathematical model of each target ruled surface according to each target ruled surface;

determining a current machining speed according to the mathematical model and preset machining process parameters; and calculating machining path data corresponding to the target ruled surface according to the current machining speed.

A readable storage medium, when instructions in the storage medium are executed by a processor of a device for generating a ruled surface machining path, enables the device for generating the ruled surface machining path to execute the method for generating the ruled surface machining path according to the embodiments of the disclosure.

According to the method for generating the ruled surface machining path of the disclosure, each target ruled surface in the three-dimensional model diagram of the target workpiece to be machined can be acquired; the mathematical model of each target ruled surface is generated according to each target ruled surface; the current machining speed is determined according to the mathematical model and the preset machining process parameters; and the machining path data corresponding to the target ruled surface is calculated according to the current machining speed. In this way, the technical problems of large errors and lack of control and compensation on natural defects of "soft cutter" machining in the existing ruled surface machining method are solved. The beneficial effects of reducing errors of ruled surface machining and improving control and compensation on the natural defects of "soft cutter" machining are obtained.

The above description is only a summary of the technical solutions of the disclosure. To understand the technical means of the disclosure more clearly so that the disclosure can be implemented according to the contents of the specification, and to make the above and other objects, features and advantages of the disclosure more obvious and understandable, the specific embodiments of the disclosure are specially illustrated hereinafter.

BRIEF DESCRIPTION OF THE DRAWINGS

Various other advantages and benefits will become apparent to those of ordinary skills in the art upon reading the following detailed description of preferred embodiments. The accompanying drawings are only for the purpose of illustrating the preferred embodiments and are not to be deemed as limiting the disclosure. Moreover, the same reference symbols are used to represent the same parts throughout the accompanying drawings. In the drawings:

FIG. 2D illustrates a schematic diagram showing that an abrasive water jet generates different taper errors on a workpiece due to different cutting speeds according to one embodiment of the disclosure;

FIG. 2E illustrates a schematic diagram showing that an abrasive water jet has a skirt-like shape error at a corner due to bending of a jet stream during cutting according to one embodiment of the disclosure;

FIG. 2F illustrates a schematic diagram showing that an abrasive water jet has a skirt-like shape error at a small arc due to bending of a jet stream during cutting according to one embodiment of the disclosure;

FIG. 2G illustrates a schematic diagram of a relationship between a cutting lag and a cutting speed according to one embodiment of the disclosure;

FIG. 2H illustrates a schematic diagram of a relationship between upper and lower widths of cut and a cutting speed according to one embodiment of the disclosure;

DESCRIPTION OF THE EMBODIMENTS

The exemplary embodiments of the disclosure will be described in further detail with reference to the accompanying drawings. Although the exemplary embodiments are shown in the accompanying drawings of the disclosure, it should be understood that the disclosure may be implemented in various forms and should not be limited by the embodiments set forth herein. On the contrary, these embodiments are provided so that the disclosure will be understood more thoroughly, and the scope of the disclosure can be fully conveyed to those skilled in the art.

A method for generating a ruled surface machining path provided by an embodiment of the disclosure is introduced in details.

Figure 1:
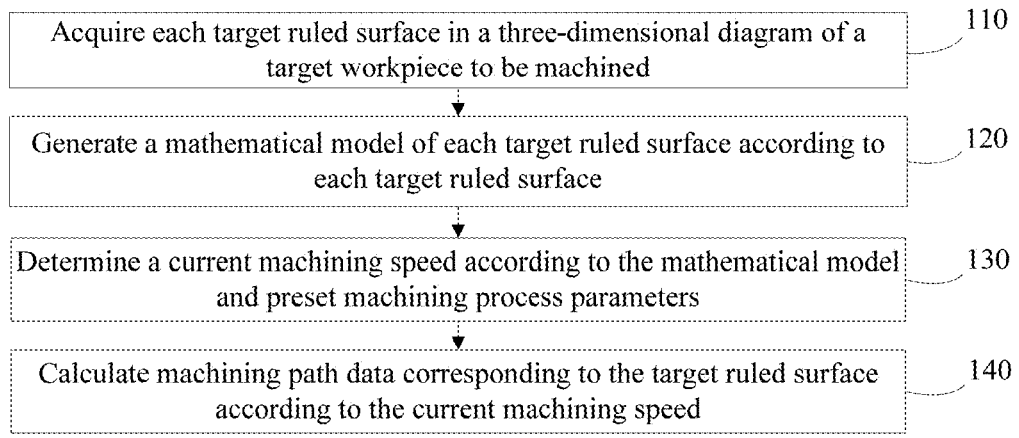
FIG. 1 illustrates a flow chart of steps of a method for generating a ruled surface machining path according to one embodiment of the disclosure.

FIG. 1 illustrates a flow chart of steps of the method for generating the ruled surface machining path in the embodiment of the disclosure, which may specifically include the following steps.

In step 110, each target ruled surface in a three-dimensional model diagram of a target workpiece to be machined is acquired.

Figure 1A:
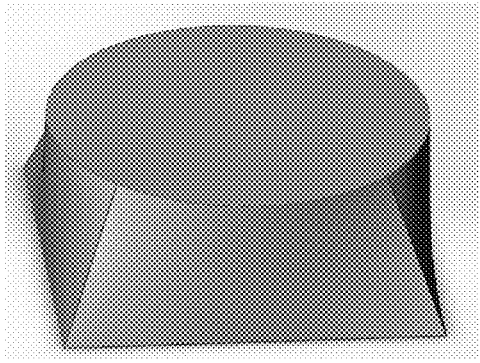
FIG. 1A illustrates a three-dimensional model diagram in which each side is a ruled surface according to one embodiment of the disclosure.

If a curved surface is represented by the mathematical equation $r(u,v)=a(u)+vl(u)$, wherein $l(u)$ is a unit vector, the curved surface is called a ruled surface. It can also be understood that the ruled surface is woven by a straight line, which is called a (straight) generatrix of the ruled surface. For example, a cylinder and a cone are both ruled surfaces, and a uniparted hyperboloid and a hyperbolic paraboloid (saddle surface) in quadric surfaces are also ruled surfaces. There is a straight generatrix of a ruled surface model at each point passing the cylinder and the cone, and there are two straight generatrixes at each point passing the uniparted hyperboloid and the hyperbolic paraboloid. That is, each of the cylinder and the cone is composed of a family of straight generatrixes, while the uniparted hyperboloid and the hyperbolic paraboloid are composed of two families of straight generatrixes. As shown in FIG. 1A, each side of the three-dimensional model diagram is a ruled surface.

Figure 1B:
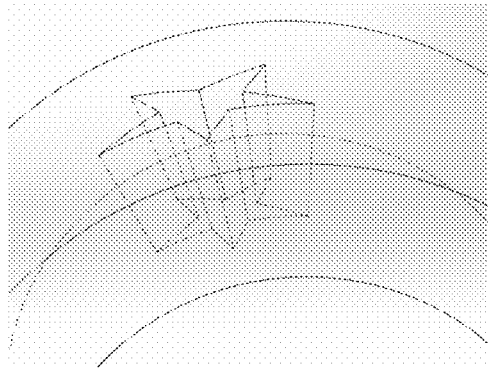
FIG. 1B illustrates a three-dimensional line model diagram of a target ruled surface according to one embodiment of the disclosure.

The target ruled surface in the embodiment of the present application may be a ruled surface corresponding to a part to be machined in the three-dimensional model diagram of the target workpiece to be machined. For example, if the target workpiece to be machined at this moment is a circular steel tube, the machining target is to machine a pentagram pattern on a surface of the circular steel tube, as shown in FIG. 1B. Then, the target ruled surface needed to be acquired at this moment is the pentagram curved surface on the surface of the circular steel tube shown in FIG. 1B. However, if the three-dimensional model diagram of the target workpiece to be machined is the workpiece in the three-dimensional model diagram shown in FIG. 1A, then the target ruled surface needed to be acquired at this moment is each ruled surface included in the three-dimensional model diagram shown in FIG. 1A.

In the embodiment of the present application, the three-dimensional model diagram of the target workpiece to be machined may be imported into CAM software, and then the target ruled surface may be selected and obtained from the three-dimensional model diagram of the target workpiece using the CAM software.

In step 120, a mathematical model of each target ruled surface is generated according to each target ruled surface.

Furthermore, in order to conveniently determine a machining path of each target ruled surface, the mathematical model of each target ruled surface needs to be generated according to each target ruled surface. Specifically, contents contained in the finally generated mathematical model of the target ruled surface may be set in the step or before the step according to requirements. For instance, the mathematical model of the target ruled surface may be set to include an upper edge curve mathematical model and a lower edge curve mathematical model of the target ruled surface, and a correlation function between an upper edge curve and a lower edge curve, etc.

Optionally, in the embodiment of the present application, the mathematical model includes the upper edge curve mathematical model and the lower edge curve mathematical model of the target ruled surface, and the correlation function between the upper edge curve and the lower edge curve; or the mathematical model includes the upper edge curve mathematical model of the target ruled surface and a machining vector direction constraining condition.

The upper edge curve of the target ruled surface refers to a curve formed by an intersection of a center line of a cutter during cutting and a feed surface during actual machining. The lower edge curve of the target ruled surface refers to a curve formed by an intersection of the cylindrical cutter and a retracting surface without compensation.

After importing the three-dimensional model diagram of the target workpiece into the CAM software, machining surfaces and non-machining surfaces (including the tool entry surface and the tool exit surface) may be set by a user. Discrete points are evenly acquired on a given curved surface to determine whether the given curved surface is a ruled surface or not according to an intersection between each point on a tangent plane of the given curved surface and the given curved surface. If the intersection does not include straight lines passing through the point, the curved surface is not a ruled surface; if the intersection includes single straight segments passing through the point, these straight segments are taken out and optimally rearranged according to initial conditions and other constraints. If the intersection includes two or more finite straight segments passing through the point, one group of straight segments are selected and optimally rearranged according to the initial conditions and other constraints. If the intersection includes infinite straight segments passing through the point, the curved surface is a plane, and one group of straight segments are rearranged according to the initial conditions and other constraints. This group of straight segments is shifted outward by one cutter offset based on the average surface normal vector of each point on each straight segment to obtain a new group of straight segments, which are interpolated into a ruled surface. The ruled surface is defined as a machining vector surface, an intersection line of the ruled surface with a predefined tool entry surface is the upper edge curve, an intersection line of the ruled surface with a predefined tool exit surface is the lower edge curve, and a corresponding function of two end points of a straight generatrix of the machining vector surface is the correlation function.

If the upper edge curve or the lower edge curve is a simple geometric curve, it is not necessary to determine a parameter equation of the geometric curve by curve fitting, while parameters of the geometric curve may be directly determined as a mathematical model of the geometric curve by using an existing function expression. A special case of the mathematical model of the simple geometric curve is an arc, and parametric equations of the arc are that $x(u)=\cos(u)$, and $y(u)=\sin(u)$. However, if the upper edge curve or the lower edge curve is not a simple geometric curve but a complex curve, curve fitting is required. Specifically, any available method may be used to perform curve fitting on the upper edge curve and the lower edge curve to further obtain the mathematical models of the upper edge curve and the lower edge curve, and this is not limited in the embodiment of the present application. A special case of the mathematical model of the complex curve is Non-Uniform Rational B-Splines (NURBS) curve parametric equation. From the above analysis, it can be seen that in the embodiment of the present application, both the mathematical model of the upper curve and the mathematical model of the lower curve may either correspond to a straight line or an arc or a spline curve, or correspond to other single complex function or one group of complex functions, or correspond to one database, etc. Moreover, during practical application, the upper edge curve and the lower edge curve corresponding to the same ruled surface may be the same or different, and the embodiment of the present application is not limited thereto.

The correlation function refers to a mathematical relationship between arc lengths S1 and S2 corresponding to current points on the upper and lower edge curves, for example: (1) $S2=C*S1$; and (2) $S2=C*S1*S1$. The former refers to a linear correlation function, while the latter refers to a nonlinear correlation function.

Figure 1C:
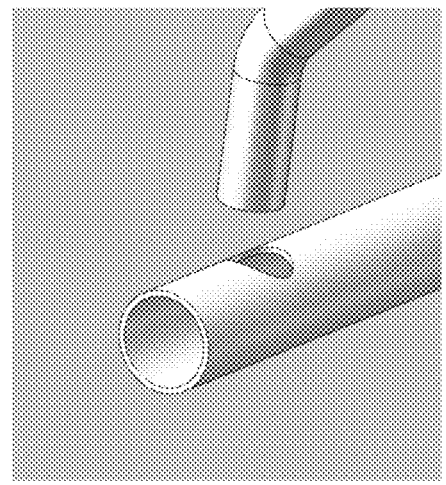
FIG. 1C illustrates a three-dimensional line model diagram of a target ruled surface according to one embodiment of the disclosure.

In addition, in the embodiment of the present application, for some cutting cases, for example, a pentagram is cut on a spherical surface of uniform thickness with the cutter everywhere perpendicular to the spherical surface, or a circle is cut on a surface of a circular tube of uniform thickness with the cutter everywhere parallel to the direction of a fixed axis, etc. The mathematical model may not need to include the mathematical model of the lower edge curve and the correlation function between the upper edge curve and the lower edge curve mentioned above, and in this case, the mathematical model may include the upper edge curve mathematical model of the target ruled surface and the machining vector direction constraining condition. The machining vector direction constraining condition may be preset according to a target workpiece or the target ruled surface. For example, for a target workpiece shown in FIG. 1B, it may be stipulated that the machining vector direction has to be perpendicular to the surface of the circular steel tube. For another example, for two circular steel tubes shown in FIG. 1C, if an interface with the circular steel tube b is to be cut on a side surface of the circular steel tube a, then a method of machining is to cut an intersection curve of the two circular tubes on the surface of the circular steel tube a. In this case, the machining vector direction constraining condition may be set as that the machining vector direction has to be coaxial with the circular steel tube b.

Optionally, in the embodiment of the present application, the mathematical model further includes a machining quality index; when the mathematical model includes the upper edge curve mathematical model of the target ruled surface and the machining vector direction constraining condition, the mathematical model further includes a thickness parameter of the workpiece.

As mentioned above, if the mathematical model includes the upper edge curve mathematical model and the lower edge curve mathematical model of the target ruled surface, and the correlation function between the upper edge curve and the lower edge curve, then an actual cutting thickness of the workpiece may be obtained according to the distance between corresponding points of the upper edge curve and the lower edge curve.

However, if the mathematical model includes the upper edge curve mathematical model of the target ruled surface and the machining vector direction constraining condition, in order to determine a cutting depth when cutting the target ruled surface, the mathematical model in this case may also include a thickness parameter of the target workpiece, so that the actual cutting thickness of the workpiece of the target ruled surface may be obtained according to the thickness parameter of the workpiece.

It should be noted that, in the embodiment of the present application, if the actual cutting thickness of the target ruled surface is uniform and equal to the thickness of the target workpiece, then the actual cutting thickness of the workpiece at each part of the target ruled surface may be directly obtained according to the thickness parameter of the target workpiece. However, if the actual cutting thickness of the target machining surface is variable, then the actual cutting thickness needs to be calculated according to the thickness parameter of the target workpiece and shapes of inner and outer surfaces of the workpiece, thus obtaining the actual cutting thickness of the workpiece at each part of the target ruled surface.

If the workpiece at each part of the target ruled surface needs to be calculated according to the workpiece thickness parameters of the target workpiece and the shapes of the inner and outer surfaces of the workpiece.

In addition, in the embodiment of the present application, if errors of using single ruled surface approximation for some curved surfaces are relatively large while errors of using upper and lower two ruled surfaces approximation are relatively small, the curved surfaces may be respectively approximated with two ruled surfaces which leads to secondary machining, and then the curved surfaces may be represented by the mathematical models of the two ruled surfaces. Specifically, some curved surfaces that require secondary machining may be specified by the user according to the specific requirements or experience, etc.

For example, after the machining vector ruled surface is generated, an actual machining surface may be formed by having the generated machining vector ruled surface equidistantly offset by one cutter offset from the original machining surface, and concave and convex portions may be marked with two significantly different colors respectively, and the maximum distance between the original machining surface and the actual machining surface measured at the offset direction may be displayed for the user to judge whether the generated machining vector ruled surface is qualified. The user may manually add auxiliary planes, auxiliary axes, etc. So that the generated machining vector ruled surface, can be extended, by keeping the machining vector direction unchanged, to be intersect with other surfaces to obtain a new machining upper edge curve and a new machining lower edge curve.

Optionally, in the embodiment of the present application, when the mathematical model includes the upper edge curve mathematical model and the lower edge curve mathematical model of the target ruled surface, and the correlation function between the upper edge curve and the lower edge curve, the step 120 may include the following substeps.

In substep 121, arrangement of machining sequence and cutter compensation are performed on all target ruled surfaces.

In substep 122, the upper edge curve and the lower edge curve of the target ruled surface are identified for each target ruled surface.

In substep 123, the upper edge curve mathematical model of the upper edge curve and the lower edge curve mathematical model of the lower edge curve are constructed.

In substep 124, the correlation function between the upper edge curve and the lower edge curve corresponding to the same target ruled surface are constructed.

In substep 125, the mathematical model of the target ruled surface is constructed according to the upper edge curve mathematical model, the lower edge curve mathematical model and the correlation function corresponding to the same target ruled surface.

It should be noted that, in the embodiment of the present application, the above substep 121 may also be executed simultaneously with the substep 122 or executed after the substep 121, and the embodiment of the present application is not limited thereto.

In step 130, a current machining speed is determined according to the mathematical model and preset machining process parameters.

In the embodiment of the present application, specific methods for determining the current machining speed according to the mathematical model and the preset machining process parameters may be different depending on different cutters used for cutting the target workpiece. Specifically, the current machining speed may be determined in different ways according to different cutters, and the embodiment of the present application is not limited thereto. Of course, in the embodiment of the present application, the current machining speed may also be determined by using the same method, and the embodiment of the present application is not limited thereto. For example, if the cutter used for cutting is an abrasive water jet, a formula in the following format may be used to calculate a current machining speed of the abrasive water jet.

$$u = \left( \frac{f_a N_m P_w^{n1} d_o^{n2} M_a^{n3}}{C q h d_m^{n4}} \right)^{n5} \quad (1)$$

Where u is the current machining speed, h is the thickness parameter of the workpiece obtained from the fore-mentioned mathematical model of the target ruled surface, and all other parameters may be deemed as the preset machining process parameters. Specifically, $f_a$ is an abrasive factor, $N_m$ is a Machinability parameter, Pw is a water pressure, do is an orifice diameter, Ma is an abrasive flow rate, q is a quality level, dm is a mixing tube diameter, C is a system constant, and n1 to n5 are experimental empirical values. In the embodiment of the present application, specific values of n1 to n5 may be pre-determined according to experiences or experiments, and the embodiment of the present application is not limited thereto.

In the embodiment of the present application, specific values of the preset machining process parameters may be set before the current step or before any step prior to the current step, and the embodiment of the present application is not limited thereto. For example, the value range of the quality level index may be set as 1 to 5, wherein 1 corresponds to the lowest quality level and 5 corresponds to the highest quality level. If all the preset machining parameters mentioned above are metric units, the system constant may be set as C1; however, if all the preset machining parameters mentioned above are imperial units, the system constant may be set as C2, or the like. Specific values of both C1 and C2 may be determined before the current step or before any step prior to the current step, and the embodiment of the present application is not limited thereto. Moreover, the quality level may also be understood as the fore-mentioned machining quality index.

Optionally, in the embodiment of the present application, the step 130 may include the following substeps.

In substep 131, a current machining speed parameter is determined according to the mathematical model and the preset machining process parameters.

In substep 132, the current machining speed is determined according to the current machining speed parameter.

In addition, during practical application, a speed value taken for the cutter used for cutting may not be random, but is taken among a plurality of different gears, and different gears correspond to different levels of machining speeds. Then, in the process of determining the current machining speed, the current machining speed parameter needs to be determined according to the mathematical model and the preset machining process parameters, so that the current machining speed is determined according to the current machining speed parameter. The current machining speed parameter may include parameters for representing speed like a gear parameter, the machining quality level, etc.

Moreover, in the embodiment of the present application, the mathematical model, a corresponding relationship between the preset machining process parameters and the machining speed parameter, a possible value range of the machining speed parameter, and a machining speed value corresponding to the machining speed parameter may be set before the current step or any step prior to the current step according to requirements or experience, and the embodiment of the present application is not limited thereto.

In step 140, machining path data corresponding to the target ruled surface is calculated according to the current machining speed.

During practical application, a movement step length of each axis of movement corresponding to a tilting head is preset, wherein the movement step length of each axis of movement corresponding to the same tilting head may or may not be exactly the same, and the movement step lengths taken by the axes of movement corresponding to different tilting heads may be different. Therefore, in the embodiment of the present application, the movement step length of each axis of movement corresponding to the tilting head may be set in advance according to requirements and corresponding tilting heads, and the embodiment of the present application is not limited thereto. Then, in the embodiment of the present application, in order to control the current machining speed, a movement time required for each axis of movement corresponding to the tilting head currently used for ruled surface machining to move by one movement step length may be controlled, and the number of movement steps within a certain time period may also be controlled. Therefore, in the embodiment of the present application, corresponding to the current position, the current direction and magnitude of the current machining speed, the displacement, the direction and magnitude of speed of each axis of movement corresponding to the current tilting head need to be calculated for the currently used tilting head, and then the number of movement steps and the movement speed corresponding to each axis of movement need to be calculated according to the preset movement step length of each axis of movement, thus obtaining the machining path data corresponding to the current target ruled surface to be machined.

It should be noted that, after the machining path data is obtained, a CNC numerical control system may package and send the machining path data to a lower computer of the CNC numerical control system. After receiving the machining path data, the lower computer may further interpolate the machining path data and send the machining path data to a servo driver or stepping motor of each axis of movement of the tilting head. In the embodiment of the present application, preferably, the lower computer may directly send the machining path data to the servo driver or stepping motor of each axis of movement of the tilting head without performing interpolation. In the embodiment of the present application, each target ruled surface in the three-dimensional model diagram of the target workpiece to be machined can be acquired; the mathematical model of each target ruled surface is generated according to each target ruled surface; the current machining speed is determined according to the mathematical model and the preset machining process parameters; and the machining path data corresponding to the target ruled surface is calculated according to the current machining speed. In this way, the machining speed of the ruled surface machining is optimized, and the control on the natural defects of "soft cutter" machining is improved.

A method for generating a ruled surface machining path provided by an embodiment of the disclosure is introduced in details.

Figure 2:
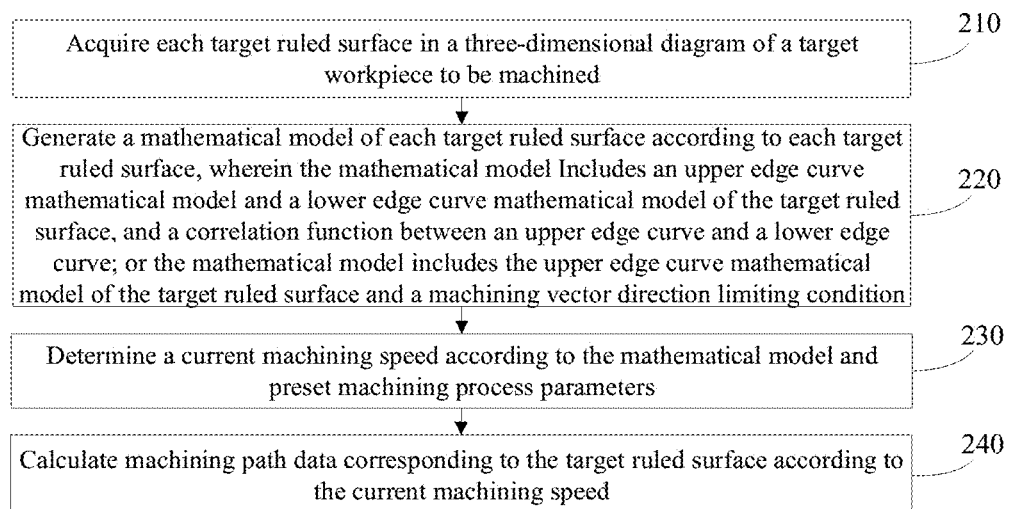
FIG. 2 illustrates a flow chart of steps of a method for generating a ruled surface machining path according to one embodiment of the disclosure.

FIG. 2 illustrates a flow chart of steps of the method for generating the ruled surface machining path in the embodiment of the disclosure, which may specifically include the following steps.

In step 210, each target ruled surface in a three-dimensional model diagram of a target workpiece to be machined is acquired.

Optionally, in the embodiment of the present application, the step 210 may include the following substeps.

In substep 211, whether each target machining surface in the three-dimensional model diagram of the target workpiece is a ruled surface satisfying preset process conditions is judged.

The preset process conditions may be determined before the current step or before any step prior to the current step according to requirements, and the embodiment of the present application is not limited thereto. For example, the preset process conditions may include a maximum tilting angle limit and the like. For example, the preset process conditions may include the maximum tilting angle because the tilting angle is limited by the specific tilting head mechanism design or safety considerations. For example, a universal tilting head can only cut a conical surface with a maximum cone angle of 30 degrees. If the inclined angle of the machining surface in the three-dimensional model diagram of the workpiece exceeds 30 degrees, the preset process conditions are not satisfied.

In substep 212, if the target machining surface is a ruled surface not satisfying the preset process conditions, a ruled surface satisfying the preset process conditions is generated according to the target machining surface as a target ruled surface corresponding to the target machining surface.

Specifically, in the embodiment of the present application, if the target machining surface is a ruled surface not satisfying the preset process conditions, a ruled surface enclosing the target machining surface and satisfying the preset process conditions may be generated as a target ruled surface corresponding to the target machining surface. In the embodiment of the present application, the fore-mentioned CAM software may be used to generate an enclosing ruled surface. Of course, any other available method or device may also be used to generate the enclosing ruled surface for the target ruled surface that is not a ruled surface satisfying the preset process conditions so that the enclosing target ruled surface satisfies the preset process conditions, and the embodiment of the present application is not limited thereto.

For example, the method to generate the enclosing ruled surface may be as follows:

(1) A single machining surface (the machining surface may be defined by the user, and in the embodiment of the present application, the machining surface may be the fore-mentioned target machining surface of the ruled surface not satisfying the preset machining conditions) in a three-dimensional model diagram is checked, and the surface is equidistantly offset by one cutter offset to obtain a surface to be machined.

(2) A maximum included angle of a normal vector of the surface to be machined is detected, and a curved surface is divided to ensure that the maximum included angle of the normal vector of each point of the single surface to be machined is not greater than a specified angle.

(3) The curved surface is projected onto a plane A according to an average surface unit normal vector direction of the surface to be machined. A normal vector direction of the plane A is the average surface unit normal vector direction of the surface to be machined.

(4) An edge projection curve of a tool entry surface, an edge projection curve of a tool exit surface, and a machining edge projection curve are identified for the projected pattern. Here machining edge is referred to the intersecting edge of two neighboring machining surfaces.

(5) A machining edge projection curve on the plane A corresponding to an inner corner is preferentially processed, by fitting it into a straight line with the least square method, and adjusting it to be within a maximum tilting angle range of a machine tool, and then translating it so that a straight segment formed by an intersection point of the machining edge projection curve with the edge projection curves of the tool entry and tool exit surfaces just moves into the projected pattern. The straight segment is taken as an initial search straight segment L0. If the first and last initial search straight segments are preset, a search center Pi defined between the two initial search straight segments is planned to be evenly distributed at a fixed interval of d on a central axis of the pattern.

(6) Straight segments are made at uniform angular intervals (within the maximum tilting angle range of the machine and not intersected with other search straight segments, and endpoints are on the edge projection curves of the tool entry and tool exit surfaces) through the search center Pi (if no search center is defined, a default P0 is a projection point of a center of the curved surface); intersection lines between a vertical plane B of the plane A through these straight segments and the curved surface are calculated, and fitted into straight lines by the least square method, wherein a straight line S has a minimum fitting variance and is within the maximum tilting angle range of the machine, the straight line S is shifted to a non-workpiece side on the plane B so as to be exactly all on the non-workpiece side; the straight line S herein is taken as a straight line Si, and the straight line Si corresponds to a straight segment Li on the projection plane.

(7) If Pi+1 is not defined, the straight segment Li on the plane and a midpoint Ci of the straight segment are pushed by a fixed distance d to the same side of a vertical direction of the Li in the plane to obtain a new search center point Pi+1. The Pi+1 is used as the search center to search for Si+1 in a range that does not intersect with Li in the plane A in a manner similar to step (6). In this way, until a length of a straight segment Ln is less than the specified value, the search on one side of L0 is completed, and the other side of L0 is searched in the same way until the entire curved surface is completely searched.

(8) The obtained straight line group Si is sorted according to a machining sequence and interpolated into a ruled surface; the ruled surface is intercepted with the tool entry surface and the tool exit surface to obtain a ruled surface C; the Si is translated by a distance T (cutter offset) towards the non-workpiece side along mean unit normal vector direction of each point on the straight line group Si corresponding to a straight generatrix Hi on the ruled surface C to obtain a group of new straight segments; the new straight segment group is screened and optimized to obtain another straight segment group Ki, then the straight segment group Ki is interpolated into a ruled surface D that serves as the machining vector surface, and intersection lines of the ruled surface D with the tool entry surface and the tool exit surface serve as a machining upper edge curve and a machining lower edge curve respectively. A unit direction vector function of the straight generatrix Ki is a machining vector function.

In step 220, a mathematical model of each target ruled surface is generated according to each target ruled surface.

Optionally, in the embodiment of the present application, the mathematical model includes an upper edge curve mathematical model and a lower edge curve mathematical model of the target ruled surface, and a correlation function between an upper edge curve and a lower edge curve; or the mathematical model includes the upper edge curve mathematical model of the target ruled surface and a machining vector direction constraining condition.

Optionally, in the embodiment of the present application, the mathematical model further includes a machining quality index; moreover, when the mathematical model includes the upper edge curve mathematical model of the target ruled surface and the machining vector direction constraining condition, the mathematical model further includes a thickness parameter of the workpiece.

Optionally, in the embodiment of the present application, when the mathematical model includes the upper edge curve mathematical model and the lower edge curve mathematical model of the target ruled surface, the correlation function between the upper edge curve and the lower edge curve, and the machining quality index, the step 220 may include the following substeps.

In substep 221, arrangement of machining sequence and cutter compensation are performed on each target ruled surface.

In substep 222, the machining quality index is set for each target ruled surface.

In order to determine the machining quality index of each target ruled surface, the machining quality index may be set for each target ruled surface according to requirements. Specifically, the machining quality index for different target ruled surfaces of the same target workpiece may be the same or different, and the embodiment of the present application is not limited thereto.

In substep 223, the upper edge curve and the lower edge curve of the target ruled surface are identified for each target ruled surface.

In substep 224, the upper edge curve mathematical model of the upper edge curve and the lower edge curve mathematical model of the lower edge curve are constructed.

In substep 225, the correlation function between the upper edge curve and the lower edge curve corresponding to the same target ruled surface are constructed.

In substep 226, the mathematical model of the target ruled surface is constructed according to the upper edge curve mathematical model, the lower edge curve mathematical model and the correlation function corresponding to the same target ruled surface and the machining quality index corresponding to the ruled surface.

In step 230, a current machining speed is determined according to the mathematical model and preset machining process parameters.

Optionally, in the embodiment of the present application, the step 230 may include the following substep.

In substep A231, a current spatial angle and an actual cutting thickness at each part of the machining path are determined.

In the embodiment of the present application, when machining, the ruled surface has to be machined according to a machining path sequence, but before the machining is performed, it is relatively convenient to determine the current spatial angle and the actual cutting thickness at each part of the machining path according to the machining path sequence when determining the machining path; of course, the current spatial angle and the actual cutting thickness at each part of the machining path may also be determined not according to the machining path sequence, and may be preset specifically according to requirements, and the embodiment of the present application is not limited thereto. Moreover, the current spatial angles corresponding to different parts of the machining path may be different from each other, or the current spatial angles at some parts may be the same. The actual cutting thickness is also the same, and is specifically related to the target ruled surface to be machined.

Optionally, in the embodiment of the present application, when the mathematical model includes the upper edge curve mathematical model and the lower edge curve mathematical model of the target ruled surface, and the correlation function between the upper edge curve and the lower edge curve, the substep A231 may include the followings.

In A2311, the upper edge curve at each part of the machining path is interpolated and segmented to obtain a first position point.

In the embodiment of the present application, interpolating and segmenting may be performed by using any available method or device, and the embodiment of the present application is not limited thereto.

In A2312, a second position point corresponding to the lower edge curve is found according to the correlation function.

As mentioned above, the correlation function can represent a mathematical relationship between the arc lengths S1 and S2 corresponding to the current points on the upper and lower edge curves; therefore, in the embodiment of the present application, after a position of a certain point in the upper or lower edge curves is known, a corresponding position point in the other curve can be obtained according to the correlation function between the upper and lower edge curves. Therefore, when the first position point of the upper edge curve is known, the second position point corresponding to the first position point in the lower edge curve can be found according to the correlation function. Similarly, in the embodiment of the present application, if the second position point is obtained by interpolating and segmenting the lower edge curve at each part of the machining path, then the first position point corresponding to the second position point in the upper edge curve can be found according to the correlation function.

In A2313, the current spatial angle and an actual cutting thickness between the first position point and the second position point are calculated according to a current machining vector formed by the first position point and the second position point.

After the first position point and the second position point are obtained, the current spatial angle and the actual cutting thickness between the first position point and the second position point can be calculated according to the current machining vector formed by the first position point and the second position point. The current spatial angle may include an included angle between the current machining vector and an X-axis direction, an included angle between the current machining vector and a Y-axis direction, and an included angle between the current machining vector and a Z-axis direction; or, the current spatial angle may also include an include angle between the current machining vector and an XZ plane and an include angle between the current machining vector and a YZ plane, etc. Of course, in the embodiment of the present application, the current spatial angle may also be represented by using any available method, and the embodiment of the present application is not limited thereto.

For example, assuming that coordinates of the first position point are (1,1,1) and coordinates of the second position point are (1,1,5), then the current spatial angle is 90 degrees from a positive direction of the X-axis, 90 degrees from a positive direction of the Y-axis, and 0 degree from a positive direction of the Z-axis. The actual cutting thickness between the first position point and the second position point is 4.

Optionally, in the embodiment of the present application, when the mathematical model includes the upper edge curve mathematical model of the target ruled surface, the machining vector direction constraining condition and the thickness parameter of the workpiece, the substep A231 may include: determining the current spatial angle and the actual cutting thickness at each part of the machining path according to the upper edge curve mathematical model, the machining vector direction constraining condition and the thickness parameter of the workpiece.

As mentioned above, the current machining vector direction may also be used to represent an extension direction of a soft cutter between the upper and lower edge curves, then the current spatial angle may be determined according to the upper edge curve mathematical model and the machining vector direction constraining conditions. The thickness parameter of the workpiece is a parameter representing a thickness of a surface to be machined; then in the embodiment of the present application, the actual cutting thickness may be calculated according to the thickness parameter of the workpiece, wherein a corresponding relationship between the thickness parameter of the workpiece and the actual cutting thickness may be preset according to requirements or experiments, and the embodiment of the present application is not limited thereto.

In substep A232, the current machining speed is calculated according to the current spatial angle and the actual cutting thickness, the machining quality index corresponding to the target ruled surface, and the preset machining process parameters.

Both the current spatial angle and the current machining vector direction can be used to represent an extending direction of the ruled surface machining cutter between the upper and lower edge curves. If the actual cutting thickness of the workpiece corresponding to the current target ruled surface is uniform, the thickness parameter of the workpiece can also represent the actual cutting thickness of the target workpiece to be machined corresponding to the current target ruled surface. Therefore, in the embodiment of the present application, the current machining speed can further be calculated according to the current spatial angle and the actual cutting thickness (i.e., the actual cutting thickness of the workpiece), the machining quality index corresponding to the target ruled surface, and the preset machining process parameters; or, the current machining speed is obtained by calculating according to the current machining vector direction and the thickness parameter of the workpiece, the machining quality index corresponding to the target ruled surface, and the preset machining process parameters.

Optionally, in the embodiment of the present application, the step 230 may include the following substep.

In substep B231, the current machining speed is calculated according to a current machining vector direction and the thickness parameter of the workpiece, the machining quality index corresponding to the target ruled surface, and the preset machining process parameters.

Optionally, in the embodiment of the present application, the step 230 may include the following substeps.

In C231, a current spatial angle and an actual cutting thickness at each part of the machining path are determined.

In C232, a first machining speed is obtained by calculating according to the current spatial angle and the actual cutting thickness, the machining quality index corresponding to the target ruled surface, and the preset machining process parameters.

In C233, the first machining speed is optimized according to the curvature of the path formed by the upper edge curve and the preset machining parameters to obtain the current machining speed.

Optionally, in the embodiment of the present application, the step 230 may include the following substeps.

In D231, the first machining speed is obtained by calculating according to a current machining vector direction and the thickness parameter of the workpiece, the machining quality index corresponding to the target ruled surface, and the preset machining process parameters.

In D232, the first machining speed is optimized according to the curvature of the path formed by the upper edge curve and the preset machining parameters to obtain the current machining speed.

The first machining speed calculated through the step C232 or D231 is a theoretical straight line machining speed, but the machining path may be curved in practical application. In order to improve the accuracy of the machined shape that is finally obtained, the first machining speed may be optimized according to the curvature of the path formed along the upper edge curve and preset machining process parameters to obtain the current machining speed. For example, at a small arc or at a corner, a quality level q in the fore-mentioned current machining speed calculation formula may be adjusted according to the angular change of the corner and the curvature of the arc, so that the optimized current machining speed is obtained by using the optimized current machining speed calculation formula.

For example, if water jet is used to cut an arc segment or a sharp corner, and if a cutter is moved at the machining speed calculated by the fore-mentioned formula (1), then a cutting drag thereof may be obtained by calculating according to a following formula:

$$L = C_L * h^{n6} / q \tag{2}$$

where $C_L$ and n6 are experimental empirical parameters. In the embodiment of the present application, specific values of $C_L$ and n6 may be determined before the step or before any step prior to the step according to requirements or experiments, etc., and the embodiment of the present application is not limited to.

For example, for a sharp corner with an angular change of A, an allowable maximum cutting drag is correlative with an allowable error limit E, that is, $L = E/\sin(A)$. Then, the quality level may be obtained as follows:

$$q = C_L * h^{n6} * E / \sin(A) \tag{3}$$

Accordingly, for a segmental arc with a radius of R, a quality level thereof is as follows:

$$q = C_L * h^{n6} / ((R+E)^2 - R^2) \tag{4}$$

It can be seen from the analysis above that, in the embodiment of the present application, in the process of optimizing the current machining speed by the method above, the optimized current machining speed may be obtained by calculating via directly using the optimized and adjusted quality level without calculating the first machining speed, and the present application is not limited thereto.

Of course, in the embodiment of the present application, the first machining speed may also be optimized by using any available method, and the embodiment of the present application is not limited thereto. Moreover, in the embodiment of the present application, indexes for optimizing the first machining speed may be determined before the current step or before any step prior to the current step according to requirements or experiments, and the embodiment of the present application is not limited thereto.

In step 240, machining path data corresponding to the target ruled surface is calculated according to the current machining speed.

Optionally, in the embodiment of the present application, the step 240 may include the following substeps.

In substep A241, a number of movement steps and a movement speed corresponding to each motion axis under a five-axis synchronizing motion condition are calculated according to the current machining speed and the current position of a machining vector.

In substep A242, the machining path data is obtained according to the number of movement steps and the movement speed corresponding to each axis of movement.

Figures 2A, 2B:
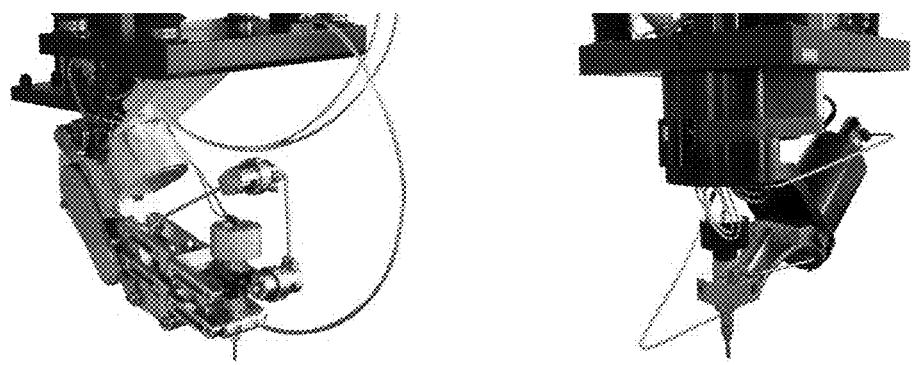
FIG. 2A illustrates a schematic structure diagram of a universal tilting head according to one embodiment of the disclosure.
FIG. 2B illustrates a schematic structure diagram of a V-shaped tilting head according to one embodiment of the disclosure.

During actual application, there may be a plurality of different designs of five-axis synchronizing motion tilting heads. For example, FIG. 2A shows a universal tilting head, and FIG. 2B shows a V-shaped tilting head. Therefore, in the embodiment of the present application, corresponding to the current position and the current direction of the machining vector, and the current machining speed, the displacement, the direction and the speed of each axis of movement in the specific tilting head need to be calculated for different tilting head designs, and then the number of movement steps and the movement speed corresponding to each axis of movement need to be calculated according to the step length of each axis of movement, thus obtaining the machining path data. Specifically, for different tilting heads, the machining path data such as the number of movement steps and the movement speed, etc., as well as the corresponding relationship between the current machining speed and the current position of the machining vector may be set before the current step or before any step prior to the current step according to requirements or experience, etc., and the embodiment of the present application is not limited thereto. In the embodiment of the present application, the number of movement steps may affect the accuracy of the cutting position. The control methods of the movement speed may be determined through the following two methods: one method is to fix the movement step length and control a time delay between two movement steps to control the movement speed; and the other method is to fix the movement step length and control the movement speed by sending different numbers of movement steps in a certain time period.

Optionally, in the embodiment of the present application, the step 240 may include the following substeps.

In substep B241, process correction parameters are calculated according to the current spatial angle, the actual cutting thickness between the first position and the second position, the machining quality index corresponding to the target ruled surface, and the current machining speed. The process correction parameters include a current path correction position and a current spatial correction angle.

In substep B242, the first position point and the current spatial angle are corrected according to the current path correction position and the current spatial correction angle.

During practical application, characteristics of an abrasive water jet used for machining the target workpiece may be summarized as high-speed abrasion, fast cooling and soft cutter.

Taking the abrasive water jet as an example, high-speed abrasion may be understood as that when the abrasive water jet is cutting, a cutting mechanism that abrasive particles impact the surface of the workpiece at a high speed to generate abrasion is applied. Because any material can be abraded, the abrasive water jet can cut any material. Fast cooling may be understood as that cutting heat is rapidly taken away by a high-speed water flow during cutting, which will not cause thermal deformation and thermal damage to the workpiece. Soft cutter may be understood as that water jet is a soft cutter, and other high-energy beams such as laser and plasma arc may also be understood as soft cutters. On one hand, "soft cutters" such as abrasive water jet, and other high-energy beams including laser and plasma arc have no rigid contact with the workpiece, so that the cutting force is small; and on the other hand, because of non-rigid blades, upper and lower machining surfaces of the workpiece are different, the cut kerf has a taper error, and bending of the jet stream during cutting results in skirt-like shape errors in corners and small arcs.

Figure 2C:
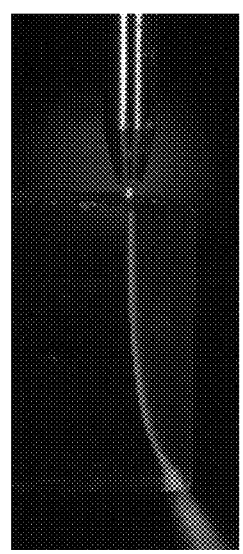
FIG. 2C illustrates a schematic diagram of an abrasive water jet with its lower portion bending backwards when cutting glass according to one embodiment of the disclosure.

FIG. 2C shows a fact presented under a high speed camera that the lower jet edge of an abrasive water jet bends backwards when cutting glass. FIG. 2D shows the situation that abrasive water jet cutting results in different taper errors on the workpiece due to different cutting speeds. It can be seen that as the cutting speed is increased, the taper error is changed from a divergent state to a straight state and then to a convergent state. FIG. 2E shows the situation that the abrasive water jet cutting results in a skirt-like shape error at the corner due to bending of the jet stream during cutting. FIG. 2F shows the situation that the abrasive water jet cutting results in a skirt-like shape error at the small arc due to bending of the jet stream during cutting.

In the embodiment of the present application, the process correction parameters may include the current path correction position and the current spatial correction angle. The current spatial correction angle may be obtained from the curvature of jet stream and the taper of the cut kerf mentioned above, and the embodiment of the present application is not limited thereto. Then, by adjusting the machining speed of the cutting head, the curvature of jet stream and the taper of cut kerf can be improved to a certain extent. A more effective method is to eliminate or greatly reduce the shape error caused by the curvature of jet stream and the taper of cut kerf by adjusting the angle of the cutting head. Therefore, in the embodiment of the present application, the curvature of jet stream and the taper of cut kerf can be compensated by changing the angle of the cutting head. Then, the process correction parameters corresponding to the machining quality index need to be calculated firstly according to the mathematical model and the preset machining process parameters. In addition, in the embodiment of the present application, the process correction parameters may also include the current machining speed correction parameters, current machining acceleration parameters, etc. Specifically, the process correction parameters may be set before the current step or before any step prior to the current step according to requirements, and the embodiment of the present application is not limited thereto. Moreover, the process correction parameters may also only include any one of the parameters mentioned above, and the embodiment of the present application is not limited thereto.

In the embodiment of the present application, the process correction parameters may be calculated according to the current spatial angle, the actual cutting thickness between the first position and the second position, the machining quality index corresponding to the target ruled surface, and the current machining speed. The curvature of the bent jet stream and the taper of cut kerf may be functions of the machining speed, or may be related to the complexity of the current machining path (such as the curvature and the corner angular change), and the embodiment of the present application is not limited thereto.

FIG. 2G is a schematic diagram of a relationship between the cutting lag (or the previous called cutting drag) and the cutting speed, wherein an x-coordinate represents the cutting speed in millimeters per minute (mm/min), a y-coordinate represents the cutting lag in millimeters, and t represents the thickness of the workpiece in millimeters. The cutting lag may be understood as the deviation between the edge on the top surface of workpiece and the edge on the bottom surface of the workpiece of a jet stream during cutting. As shown in 1 in FIG. 2G, the curvature of the bent jet stream may be represented by using the cutting lag in the embodiment of the present application.

FIG. 2H shows a schematic diagram of a relationship between upper and lower widths of cut and a traverse speed. wherein the x-coordinate represents the cutting speed (Traverse Speed), and the y-coordinate represents the width of cut in millimeters; SUS340 represents a material model of the target workpiece; P represents a pressure value of a high-pressure pump used to generate a "soft cutter" in megapascals (MPa); dw represents an inner diameter of a water nozzle in millimeters; dA is an inner diameter of an abrasive nozzle (also known as an orifice/mixing tube) in millimeters; Garnet Sand #80 represents that the abrasive material is garnet in 80-mesh; m represents an abrasive flow rate in kilogram per minute (kg/min); S represents a distance between the abrasive nozzle and the target workpiece in millimeters; t represents the thickness of the workpiece;

Upper represents a width of cut in an upper surface; and Lower represents a width of cut in a lower surface. In addition, w=1.34−0.0937 Log(u) in FIG. 2F represents a fitting function of a straight line indicated by an arrow, wherein w represents the width of cut and u represents the cutting speed. In the embodiment of the present application, the difference between upper and lower widths of cut can be used to represent the taper of cut.

In the embodiment of the present application, a change in the machining speed may lead to a change in the forementioned curvature of the bent jet stream and changes in the upper and lower widths of cut, so that when the machining data is determined, the current path correction position and the current spatial correction angle may be calculated according to the current spatial angle, the actual cutting thickness between the first position point and the second position point, the machining quality index corresponding to the target ruled surface, and the current machining speed. Then, the first position point and the current spatial angle are corrected according to the current path correction position and the current spatial correction angle.

For example, at a certain corner point, due to the slow machining speed, the cut in the upper surface is widened by 0.1 mm, then the machining path may be offset by the same distance to compensate for the change in the width of cut; or at the same point, due to a change of 0.5 degree in the taper of cut, the cutting head may need to be offset by 0.5 degree additionally to compensate for the changed taper of cut; or at the same point, due to the slow machining speed, the line connecting the jet entry point and the jet exit point has a forward angular change of one degree from the vertical direction, and the cutting head may need to be tilt backwardly by one degree additionally to make the jet exit point and the jet entry point aligning up on the same vertical line, so that the skirt-like shape errors will not occur at the corner. The correction amounts of the width of cut, the taper of cut and the longitudinal inclined angle of the jet stream are changed with the change of the machining speed, thus ensuring that the natural defects of the "soft cutter" machining are controlled and compensated to the greatest extent.

In substep B243, the number of movement steps and the movement speed corresponding to each motion axis under the five-axis synchronizing motion condition are calculated according to the corrected first position point, the corrected current spatial angle and the current machining speed.

In substep B244, the machining path data is obtained according to the number of movement steps and the movement speed corresponding to each axis of movement.

In the embodiment of the present application, each target ruled surface in the three-dimensional model diagram of the target workpiece to be machined can be acquired; the mathematical model of each target ruled surface is generated according to each target ruled surface; the current machining speed is determined according to the mathematical model and the preset machining process parameters; and the machining path data corresponding to the target ruled surface is calculated according to the current machining speed. In this way, the machining speed of the ruled surface machining is optimized, and the control on the natural defects of "soft cutter" machining is improved.

Moreover, in the embodiment of the present application, the upper edge curve can be interpolated and segmented at each part of the machining path to obtain the first position point when determining the current machining speed according to the mathematical model and the preset machining process parameters; the second position point corresponding to the lower edge curve is found according to the correlation function; the current spatial angle and the actual cutting thickness between the first position point and the second position point is calculated according to the current machining vector formed by the first position point and the second position point; the first machining speed is obtained by calculating according to the current spatial angle and the actual cutting thickness, the machining quality index corresponding to the target ruled surface, and the preset machining process parameters; or, the first machining speed is obtained by calculating according to the current machining vector direction and the thickness parameter of the workpiece, the machining quality index corresponding to the target ruled surface, and the preset machining process parameters; and the first machining speed is optimized according to the curvature of the path formed by the upper edge curve and the preset machining parameters to obtain the current machining speed. Therefore, the machining speed of the ruled surface machining can be further optimized, and the control on the natural defects of "soft cutter" machining can be improved.

Moreover, in the embodiment of the present application, the process correction parameters can further be calculated according to the current spatial angle, the actual cutting thickness between the first position and the second position, the machining quality index corresponding to the target ruled surface, and the current machining speed; the process correction parameters include the current path correction position and the current spatial correction angle; the first position point and the current spatial angle are corrected according to the current path correction position and the current spatial correction angle; the number of movement steps and the movement speed corresponding to each motion axis under the five-axis synchronizing motion condition are calculated according to the corrected first position point, the corrected current spatial angle and the current machining speed; and the machining path data is obtained according to the number of movement steps and the movement speed corresponding to each axis of movement. Similarly, the errors of ruled surface machining can be significantly reduced and control and compensation on the natural defects of "soft cutter" machining can be improved.

For the sake of simplicity, the method embodiments are all expressed as a series of action combinations, but those skilled in the art should understand that the embodiments of the disclosure are not limited by the described action sequences, because certain steps may be performed in other sequences or concurrently according to the embodiments of the disclosure. Secondly, those skilled in the art should also understand that the embodiments described in the specification are all preferred embodiments, and the actions involved are not necessarily required by the embodiments of the disclosure.

An apparatus for generating a ruled surface machining path provided by an embodiment of the disclosure is introduced in details.

Figure 3:
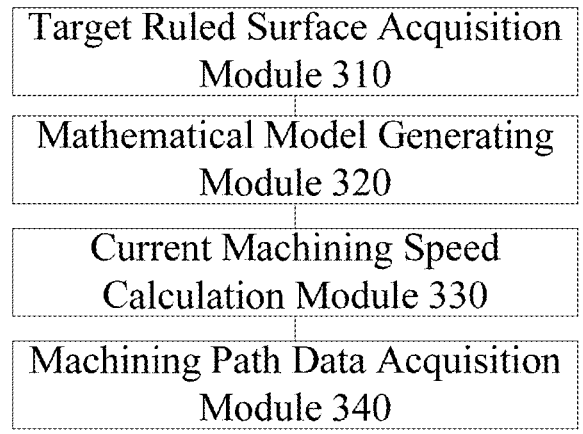
FIG. 3 illustrates a schematic structure diagram of an apparatus for generating a ruled surface machining path according to one embodiment of the disclosure.

FIG. 3 illustrates a schematic structure diagram of the apparatus for generating the ruled surface machining path in the embodiment of the disclosure, which may specifically include the following modules.

A target ruled surface acquisition module 310 is configured to acquire each target ruled surface in a three-dimensional diagram of a target workpiece to be machined.

A mathematical model generating module 320 is configured to generate a mathematical model of each target ruled surface according to each target ruled surface.

Optionally, in the embodiment of the present application, the mathematical model includes an upper edge curve mathematical model and a lower edge curve mathematical model of the target ruled surface, and a correlation function between an upper edge curve and a lower edge curve.

Optionally, in the embodiment of the present application, the mathematical model generating module 320 may include the following modules.

A sorting and cutter compensation module is configured to perform sorting and cutter compensation on each target ruled surface.

An upper and lower edge curve identification module is configured to identify the upper edge curve and the lower edge curve of the target ruled surface for each target ruled surface.

An upper and lower edge curve constructing module is configured to construct the upper edge curve mathematical model of the upper edge curve and the lower edge curve mathematical model of the lower edge curve.

A correlation function constructing module is configured to construct the correlation function between the upper edge curve and the lower edge curve corresponding to the same target ruled surface.

A first mathematical model generating module is configured to construct the mathematical model of the target ruled surface according to the upper edge curve mathematical model, the lower edge curve mathematical model and the correlation function corresponding to the same target ruled surface.

A current machining speed calculation module 330 is configured to determine a current machining speed according to the mathematical model and preset machining process parameters.

Optionally, in the embodiment of the present application, the current machining speed calculation module 320 may include the following modules.

A current machining speed parameter determination module is configured to determine a current machining speed parameter according to the mathematical model and the preset machining process parameters.

A current machining speed determination module is configured to determine a current machining speed according to the current machining speed parameter.

A machining path data acquisition module 340 is configured to calculate machining path data corresponding to the target ruled surface according to the current machining speed.

In the embodiment of the present application, each target ruled surface in the three-dimensional diagram of the target workpiece to be machined can be acquired; the mathematical model of each target ruled surface is generated according to each target ruled surface; the current machining speed is determined according to the mathematical model and the preset machining process parameters; and the machining path data corresponding to the target ruled surface is calculated according to the current machining speed. In this way, the machining speed of the ruled surface machining is optimized, and the control on the natural defects of "soft knife" machining is improved.

An apparatus for generating a ruled surface machining path provided by an embodiment of the disclosure is introduced in details.

Figure 4:
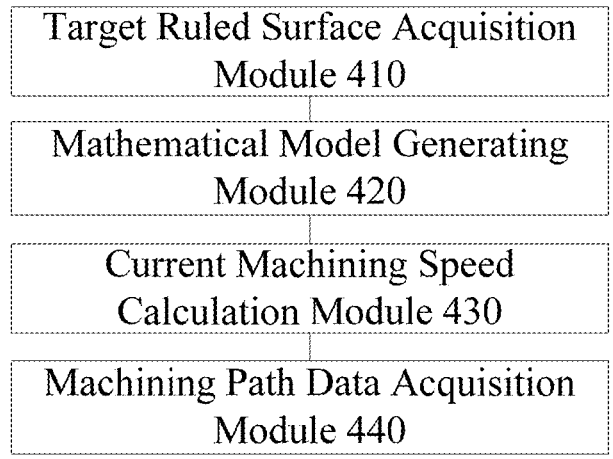
FIG. 4 illustrates a schematic structure diagram of another apparatus for generating a ruled surface machining path according to one embodiment of the disclosure.

FIG. 4 illustrates a schematic structure diagram of the apparatus for generating the ruled surface machining path in the embodiment of the disclosure, which may specifically include the following modules.

A target ruled surface acquisition module 410 is configured to acquire each target ruled surface in a three-dimensional diagram of a target workpiece to be machined.

Optionally, in the embodiment of the present application, the target ruled surface acquisition module 410 may include the following modules.

A ruled surface judging module is configured to judge whether each target machining surface in the three-dimensional diagram of the target workpiece is a ruled surface satisfying preset process conditions.

A target ruled surface generating module is configured to, if the target machining surface is a ruled surface not satisfying the preset process conditions, generate a ruled surface satisfying the preset process conditions according to the target machining surface as a target ruled surface corresponding to the target machining surface.

A mathematical model generating module 420 is configured to generate a mathematical model of each target ruled surface according to each target ruled surface.

Optionally, when the mathematical model includes an upper edge curve mathematical model and a lower edge curve mathematical model of the target ruled surface, a correlation function between an upper edge curve and a lower edge curve, and a machining quality index, the mathematical model generating module includes the following modules.

A sorting and cutter compensation module is configured to perform sorting and cutter compensation on each target ruled surface.

A machining quality index setting module is configured to set the machining quality index for each target ruled surface.

An upper and lower edge curve identification module is configured to identify the upper edge curve and the lower edge curve of the target ruled surface for each target ruled surface.

An upper and lower edge curve constructing module is configured to construct the upper edge curve mathematical model of the upper edge curve and the lower edge curve mathematical model of the lower edge curve.

A correlation function constructing module is configured to construct the correlation function between the upper edge curve and the lower edge curve corresponding to the same target ruled surface.

A second mathematical model generating module is configured to construct the mathematical model of the target ruled surface according to the upper edge curve mathematical model, the lower edge curve mathematical model and the correlation function corresponding to the same target ruled surface and the machining quality index corresponding to the ruled surface.

A current machining speed calculation module 430 is configured to determine a current machining speed according to the mathematical model and preset machining process parameters.

Optionally, in the embodiment of the present application, the current machining speed calculation module 430 may include the following module.

An angle and thickness determination module is configured to determine a current spatial angle and an actual cutting thickness at each part of the machining path.

Optionally, in the embodiment of the present application, when the mathematical model includes the upper edge curve mathematical model and the lower edge curve mathematical model of the target ruled surface, and the correlation function between the upper edge curve and the lower edge curve, the angle thickness determination module may include the following modules.

A first position point determination module is configured to interpolate and segment the upper edge curve at each part of the machining path to obtain a first position point.

A second position point determination module is configured to find a second position point corresponding to the lower edge curve according to the correlation function.

A first angle and thickness calculation module is configured to calculate the current spatial angle and an actual cutting thickness between the first position point and the second position point according to a current machining vector formed by the first position point and the second position point.

Optionally, in the embodiment of the present application, when the mathematical model includes the upper edge curve mathematical model of the target ruled surface, the machining vector direction constraining condition and the thickness parameter of the workpiece, the angle and thickness determination module may include the following modules.

A second angle and thickness calculation module is configured to determine the current spatial angle and the actual cutting thickness at each part of the machining path according to the upper edge curve mathematical model, the machining vector direction constraining condition and the thickness parameter of the workpiece.

A first current machining speed calculation module is configured to calculate a current machining speed according to the current spatial angle and the actual cutting thickness, the machining quality index corresponding to the target ruled surface, and the preset machining process parameters.

Optionally, in the embodiment of the present application, the current machining speed calculation module 430 may include the following module.

A second current machining speed calculation module is configured to calculate a current machining speed according to the current machining vector direction and the thickness parameter of the workpiece, the machining quality index corresponding to the target ruled surface, and the preset machining process parameters.

Optionally, in the embodiment of the present application, the current machining speed calculation module 430 may include the following modules.

An angle and thickness determination module is configured to determine a current spatial angle and an actual cutting thickness at each part of the machining path.

A first machining speed calculation module is configured to obtain a first machining speed by calculating according to the current spatial angle and the actual cutting thickness, the machining quality index corresponding to the target ruled surface, and the preset machining process parameters.

A third current machining speed calculation module is configured to optimize the first machining speed according to a curvature of a path formed by the upper edge curve and the preset machining parameters to obtain the current machining speed.

Optionally, in the embodiment of the present application, the current machining speed calculation module 430 may include the following modules.

A second machining speed calculation module is configured to obtain a first machining speed by calculating according to the current machining vector direction and the thickness parameter of the workpiece, the machining quality index corresponding to the target ruled surface, and the preset machining process parameters.

A third current machining speed calculation module is configured to optimize the first machining speed according to a curvature of a path formed by the upper edge curve and the preset machining parameters to obtain the current machining speed.

A machining path data acquisition module 440 is configured to calculate machining path data corresponding to the target ruled surface according to the current machining speed.

Optionally, in the embodiment of the present application, the machining path data acquisition module 440 may include the following modules.

A first movement parameter calculation module is configured to calculate a number of movement steps and a movement speed corresponding to each motion axis under a five-axis linkage condition according to the current machining speed and a current position of a machining vector.

A machining path data acquisition module is configured to obtain the machining path data according to the number of movement steps and the movement speed corresponding to each axis of movement.

Optionally, in the embodiment of the present application, the machining path data acquisition module 440 may include the following modules.

A correction parameter calculation module is configured to calculate process correction parameters according to the current space angle, the actual cutting thickness between the first position and the second position, the machining quality index corresponding to the target ruled surface, and the current machining speed; the process correction parameters include a current path correction position and a current spatial correction angle.

A correction module is configured to correct the first position point and the current spatial angle according to the current path correction position and the current spatial correction angle.

A second movement parameter calculation module is configured to calculate the number of movement steps and the movement speed corresponding to each motion axis under the five-axis linkage condition according to the corrected first position point, the corrected current space angle and the current machining speed.

A machining path data acquisition module is configured to obtain the machining path data according to the number of movement steps and the movement speed corresponding to each axis of movement.

In the embodiment of the present application, each target ruled surface in the three-dimensional diagram of the target workpiece to be machined can be acquired; the mathematical model of each target ruled surface is generated according to each target ruled surface; the current machining speed is determined according to the mathematical model and the preset machining process parameters; and the machining path data corresponding to the target ruled surface is calculated according to the current machining speed. In this way, the machining speed of the ruled surface machining is optimized, and the control on the natural defects of "soft knife" machining is improved.

Moreover, in the embodiment of the present application, the upper edge curve can be interpolated and segmented at each part of the machining path to obtain the first position point when determining the current machining speed according to the mathematical model and the preset machining process parameters; the second position point corresponding to the lower edge curve is found according to the correlation function; the current spatial angle and the actual cutting thickness between the first position point and the second position point is calculated according to the current machining vector formed by the first position point and the second position point; the first machining speed is obtained by calculating according to the current spatial angle and the actual cutting thickness, the machining quality index corresponding to the target ruled surface, and the preset machining process parameters; or, the first machining speed is obtained by calculating according to the current machining vector direction and the thickness parameter of the workpiece, the machining quality index corresponding to the target ruled surface, and the preset machining process parameters; and the first machining speed is optimized according to the curvature of the path formed by the upper edge curve and the preset machining parameters to obtain the current machining speed. Therefore, errors of ruled surface machining can be further reduced and control and compensation on the natural defects of "soft knife" machining can be improved.

Moreover, in the embodiment of the present application, the process correction parameters can further be calculated according to the current space angle, the actual cutting thickness between the first position and the second position, the machining quality index corresponding to the target ruled surface, and the current machining speed; the process correction parameters include the current path correction position and the current spatial correction angle; the first position point and the current spatial angle are corrected according to the current path correction position and the current spatial correction angle; the number of movement steps and the movement speed corresponding to each motion axis under the five-axis linkage condition are calculated according to the corrected first position point, the corrected current space angle and the current machining speed; and the machining path data is obtained according to the number of movement steps and the movement speed corresponding to each axis of movement. Similarly, the errors of ruled surface machining can be further reduced and control and compensation on the natural defects of "soft knife" machining can be improved.

As for the apparatus embodiment, since it is basically similar to the method embodiments, the description of the apparatus embodiment is relatively simple. For relevant points, please refer to the partial description of the method embodiments.

A device for generating a ruled surface machining path provided by an embodiment of the disclosure is introduced in details.

Figure 5:
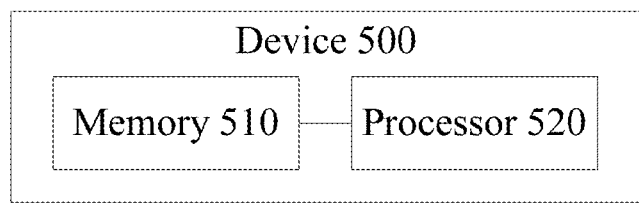
FIG. 5 illustrates a schematic structure diagram of a device for generating a ruled surface machining path according to one embodiment of the disclosure.

FIG. 5 illustrates a schematic structure diagram of a device for generating a ruled surface machining path in one embodiment of the disclosure. The device 500 may include the following modules.

A memory 510 is loaded with a plurality of executable instructions.

A processor 520 is configured to execute the plurality of executable instructions; the plurality of executable instructions include a method of executing the following steps:

acquiring each target ruled surface in a three-dimensional diagram of a target workpiece to be machined;

generating a mathematical model of each target ruled surface according to each target ruled surface;

determining a current machining speed according to the mathematical model and preset machining process parameters; and calculating machining path data corresponding to the target ruled surface according to the current machining speed.

In the embodiment of the present application, each target ruled surface in the three-dimensional diagram of the target workpiece to be machined can be acquired; the mathematical model of each target ruled surface is generated according to each target ruled surface; the current machining speed is determined according to the mathematical model and the preset machining process parameters; and the machining path data corresponding to the target ruled surface is calculated according to the current machining speed. In this way, the machining speed of the ruled surface machining is optimized, and the control on the natural defects of "soft knife" machining is improved.

Moreover, in the embodiment of the present application, process correction parameters corresponding to the machining quality index can also be calculated according to the mathematical model and the preset machining process parameters; moreover, the upper edge curve at each part of the machining path is interpolated and segmented to obtain the first position point when determining the current machining speed according to the mathematical model and the preset machining process parameters; the second position point corresponding to the lower edge curve is found according to the correlation function; the current spatial angle and the actual cutting thickness between the first position point and the second position point is calculated according to the current machining vector formed by the first position point and the second position point; the first machining speed is obtained by calculating according to the current spatial angle and the actual cutting thickness, the machining quality index corresponding to the target ruled surface, and the preset machining process parameters; or, the first machining speed is obtained by calculating according to the current machining vector direction and the thickness parameter of the workpiece, the machining quality index corresponding to the target ruled surface, and the preset machining process parameters; and the first machining speed is optimized according to the curvature of the path formed by the upper edge curve and the preset machining parameters to obtain the current machining speed. Therefore, errors of ruled surface machining can be further reduced and control and compensation on the natural defects of "soft knife" machining can be improved.

Moreover, in the embodiment of the present application, the process correction parameters can further be calculated according to the current space angle, the actual cutting thickness between the first position and the second position, the machining quality index corresponding to the target ruled surface, and the current machining speed; the process correction parameters include the current path correction position and the current spatial correction angle; the first position point and the current spatial angle are corrected according to the current path correction position and the current spatial correction angle; the number of movement steps and the movement speed corresponding to each motion axis under the five-axis linkage condition are calculated according to the corrected first position point, the corrected current space angle and the current machining speed; and the machining path data is obtained according to the number of movement steps and the movement speed corresponding to each axis of movement. Similarly, the errors of ruled surface machining can be further reduced and control and compensation on the natural defects of "soft knife" machining can be improved.

The embodiments of the disclosure further provide a readable storage medium including any mechanism for storing or transmitting information in a form readable by a computer (e.g., a computer). For example, the readable storage medium includes a Read Only Memory (ROM), a Random Access Memory (RAM), a magnetic disk storage medium, a flash storage medium, electrical, optical, acoustical or other forms of propagated signals (e.g., carrier waves, infrared signals, digital signals), etc.

The algorithms and displays provided herein are not inherently related to any particular computer, virtual system, or other devices. Various general-purpose systems may also be used with teachings based herein. From the above description, structures required to construct such a system are obvious. Furthermore, the disclosure is not directed to any particular programming language. It should be understood that the contents of the disclosure described herein can be implemented using various programming languages, and the above description of specific languages is for the purpose of disclosing the best embodiment of the disclosure.

Numerous specific details are given in the specification provided herein. However, it is to be understood that the embodiments of the disclosure may be practiced without these specific details. In some examples, well-known methods, structures and arts have not been shown in detail so as not to obscure the understanding of this specification.

Similarly, it should be understood that in the above description of the exemplary embodiments of the disclosure, various features of disclosure are sometimes grouped together into a single embodiment, drawing, or description thereof in order to streamline the disclosure and help understand one or more of various disclosed aspects. However, the disclosed methods should not be construed as reflecting the following intention that the disclosure sought to be protected requires more features than those specifically recited in each claim. More specifically, as reflected in the following claims, the disclosed aspects lie in being less than all features of a single embodiment disclosed previously. Therefore, the claims following the specific embodiments are hereby expressly incorporated into the specific embodiments, wherein each claim itself serves as a separate embodiment of the disclosure.

Those skilled in the art can understand that the modules in the device in the embodiments can be adaptively changed and disposed in one or more devices different from the embodiment. The modules or units or components in the embodiments may be combined into one module or unit or component, and in addition, the modules or units or components may be divided into a plurality of sub-modules or sub-units or sub-components. In addition to the mutual exclusion of at least some of such features and/or processes or units, all of the features disclosed in the specification (including the accompanying claims, abstract and drawings), and all the processes or units of any method or device disclosed in this manner may be combined in any combination. Unless explicitly stated otherwise, each feature disclosed in this specification (including accompanying claims, abstract and drawings) may be replaced by alternative features that provide the same, equivalent or similar purpose.

In addition, those skilled in the art can understand that although some embodiments described herein include some features included in other embodiments rather than other features, combinations of features of different embodiments are meant to be within the scope of the disclosure and form different embodiments. For example, in the following claims, any one of the embodiments sought to be protected can be used in any combination.

Various member embodiments of the disclosure may be implemented in hardware, or in software modules running on one or more processors, or in a combination thereof. Those skilled in the art will appreciate that a microprocessor or a Digital Signal Processor (DSP) may be used in practice to implement some or all of the functions of some or all of the members in the device for generating the ruled surface machining path according to the embodiments of the disclosure. The disclosure may also be implemented as a device or apparatus program (e.g., a computer program and a computer program product) for performing some or all of the methods described herein. Such a program for implementing the disclosure may be stored on a computer readable medium or may have the form of one or more signals. Such signals can be downloaded from Internet websites, or provided on carrier signals, or provided in any other form.

It should be noted that the above-mentioned embodiments illustrate rather than limit the disclosure, and those skilled in the art can design alternative embodiments without departing from the scope of the appended claims. In the claims, any reference signs placed between parentheses shall not be construed as limiting the claims. The word "including" does not exclude the presence of elements or steps not listed in the claims. The word "a" or "an" preceding an element does not exclude the presence of a plurality of such elements. The disclosure may be implemented by means of hardware including a plurality of different elements and by means of a suitably programmed computer. In the claims enumerating a plurality of apparatuses, several of these apparatuses can be specifically embodied by the same hardware item. The use of the words first, second, and third does not indicate any order. These words can be interpreted as names.

What is claimed is:

1. A method for generating a ruled surface machining path, comprising:
    acquiring each target ruled surface in a three-dimensional diagram of a target workpiece to be machined, wherein the three-dimensional diagram of the target workpiece to be machined is used in a Computer Aided Manufacturing software;
    generating a mathematical model of each target ruled surface according to each target ruled surface; determining a current machining speed according to the mathematical model and preset machining process parameters;
    calculating machining path data corresponding to the target ruled surface according to the current machining speed; and
    controlling the current machining speed according to the machining path data, wherein the mathematical model comprises an upper edge curve mathematical model, a lower edge curve mathematical model, and a correlation function between an upper edge curve and a lower edge curve of the target ruled surface; and the step of generating the mathematical model of each target ruled surface according to each target ruled surface comprises:
    performing sorting and cutter compensation on each target ruled surface;
    identifying the upper edge curve and the lower edge curve of the target ruled surface for each target ruled surface; and
    constructing the upper edge curve mathematical model of the upper edge curve and the lower edge curve mathematical model of the lower edge curve.

2. The method according to claim 1, wherein the mathematical model further comprises a machining quality index, wherein the mathematical model comprises the upper edge curve mathematical model, and a machining vector direction constraining condition of the target ruled surface, and the mathematical model further comprises a thickness parameter of the workpiece.

3. The method according to claim 2, wherein the mathematical model comprises the upper edge curve mathematical model, the lower edge curve mathematical model, the correlation function between the upper edge curve and the lower edge curve, and the machining quality index of the target ruled surface, and the step of generating the mathematical model of each target ruled surface according to each target ruled surface comprises:

performing sorting and cutter compensation on each target ruled surface;

setting the machining quality index for each target ruled surface;

identifying the upper edge curve and the lower edge curve of the target ruled surface for each target ruled surface;

constructing the upper edge curve mathematical model of the upper edge curve and the lower edge curve mathematical model of the lower edge curve;

constructing the correlation function between the upper edge curve and the lower edge curve corresponding to the same target ruled surface; and constructing the mathematical model of the target ruled surface according to the upper edge curve mathematical model, the lower edge curve mathematical model, the correlation function and the machining quality index corresponding to the same ruled surface.

4. The method according to claim 2, wherein the step of determining the current machining speed according to the mathematical model and the preset machining process parameters comprises:

determining a current spatial angle and an actual cutting thickness at each part of the machining path;

calculating the current machining speed according to the current spatial angle and the actual cutting thickness, the machining quality index corresponding to the target ruled surface, and the preset machining process parameters;

or, calculating the current machining speed according to a current machining vector direction and the thickness parameter of the workpiece, the machining quality index corresponding to the target ruled surface, and the preset machining process parameters.

5. The method according to claim 4, wherein the mathematical model comprises the upper edge curve mathematical model, the lower edge curve mathematical model, and the correlation function between the upper edge curve and the lower edge curve of the target ruled surface, and the step of determining the current spatial angle and the actual cutting thickness at each part of the machining path comprises:

interpolating and segmenting the upper edge curve at each part of the machining path to obtain a first position point;

finding a second position point corresponding to the lower edge curve according to the correlation function; and calculating the current spatial angle and an actual cutting thickness between the first position point and the second position point according to a current machining vector formed by the first position point and the second position point.

6. The method according to claim 4, wherein the mathematical model comprises the upper edge curve mathematical model of the target ruled surface, the machining vector direction constraining condition and the thickness parameter of the workpiece, and the step of determining the current spatial angle and the actual cutting thickness at each part of the machining path comprises:

determining the current spatial angle and the actual cutting thickness at each part of the machining path according to the upper edge curve mathematical model, the machining vector direction constraining condition and the thickness parameter of the workpiece.

7. The method according to claim 4, wherein the step of calculating the machining path data corresponding to the target ruled surface according to the current machining speed comprises:

calculating movement steps and a movement speed corresponding to each axis of movement under a five-axis linkage condition according to the current machining speed and a current position of a machining vector; and obtaining the machining path data according to the movement steps and the movement speed corresponding to each axis of movement.

8. The method according to claim 4, wherein the step of calculating the machining path data corresponding to the target ruled surface according to the current machining speed comprises:

calculating process correction parameters according to the current spatial angle, the actual cutting thickness, the machining quality index corresponding to the target ruled surface, and the current machining speed; the process correction parameters comprise a current path correction position and a current spatial correction angle;

correcting the first position point and the current spatial angle according to the current path correction position and the current spatial correction angle;

calculating the movement steps and the movement speed corresponding to each motion axis under the five-axis linkage condition according to the corrected first position point, the corrected current spatial angle and the current machining speed; and obtaining the machining path data according to the movement steps and the movement speed corresponding to each axis of movement.

9. The method according to claim 2, wherein the step of determining the current machining speed according to the mathematical model and the preset machining process parameters comprises:

determining a current spatial angle and an actual cutting thickness at each part of the machining path;

obtaining a first machining speed by calculating according to the current spatial angle and the actual cutting thickness, the machining quality index corresponding to the target ruled surface, and the preset machining process parameters;

or, obtaining the first machining speed by calculating according to a current machining vector direction and the thickness parameter of the workpiece, the machining quality index corresponding to the target ruled surface, and the preset machining process parameters; and optimizing the first machining speed according to a curvature of a path formed by the upper edge curve and the preset machining parameters to obtain the current machining speed.

10. The method according to claim 1, wherein the step of generating the mathematical model of each target ruled surface according to each target ruled surface further comprises: constructing the correlation function between the upper edge curve and the lower edge curve corresponding to the same target ruled surface; and constructing the mathematical model of the target ruled surface according to the upper edge curve mathematical model, the lower edge curve mathematical model and the correlation function corresponding to the same target ruled surface.

11. The method according to claim 1, wherein the step of determining the current machining speed according to the mathematical model and the preset machining process parameters comprises:
 determining a current machining speed parameter according to the mathematical model and the preset machining process parameters; and
 determining the current machining speed according to the current machining speed parameter.

12. The method according to claim 1, wherein the step of acquiring each target ruled surface in the three-dimensional diagram of the target workpiece to be machined comprises:
 judging whether each target machining surface in the three-dimensional diagram of the target workpiece is a ruled surface satisfying preset process conditions; and
 in response to judging that the target machining surface is not a ruled surface satisfying the preset process conditions, generating a ruled surface satisfying the preset process conditions according to the target machining surface as a target ruled surface corresponding to the target machining surface.

13. The method according to claim 1, wherein the mathematical model comprises the upper edge curve mathematical model, the lower edge curve mathematical model, and the correlation function between the upper edge curve and the lower edge curve of the target ruled surface, and the step of determining the current spatial angle and the actual cutting thickness at each part of the machining path comprises:
 interpolating and segmenting the upper edge curve at each part of the machining path to obtain a first position point;
 finding a second position point corresponding to the lower edge curve according to the correlation function; and
 calculating the current spatial angle and an actual cutting thickness between the first position point and the second position point according to a current machining vector formed by the first position point and the second position point.

14. The method according to claim 1, wherein the mathematical model comprises the upper edge curve mathematical model of the target ruled surface, the machining vector direction constraining condition and the thickness parameter of the workpiece, and the step of determining the current spatial angle and the actual cutting thickness at each part of the machining path comprises:
 determining the current spatial angle and the actual cutting thickness at each part of the machining path according to the upper edge curve mathematical model, the machining vector direction constraining condition and the thickness parameter of the workpiece.

15. The method according to claim 1, wherein the step of calculating the machining path data corresponding to the target ruled surface according to the current machining speed comprises:
 calculating movement steps and a movement speed corresponding to each axis of movement under a five-axis linkage condition according to the current machining speed and a current position of a machining vector; and
 obtaining the machining path data according to the movement steps and the movement speed corresponding to each axis of movement.

16. The method according to claim 1, wherein the step of calculating the machining path data corresponding to the target ruled surface according to the current machining speed comprises:
 calculating process correction parameters according to the current spatial angle, the actual cutting thickness, the machining quality index corresponding to the target ruled surface, and the current machining speed; the process correction parameters comprise a current path correction position and a current spatial correction angle;
 correcting the first position point and the current spatial angle according to the current path correction position and the current spatial correction angle;
 calculating the movement steps and the movement speed corresponding to each motion axis under the five-axis linkage condition according to the corrected first position point, the corrected current spatial angle and the current machining speed; and
 obtaining the machining path data according to the movement steps and the movement speed corresponding to each axis of movement.

17. A device for generating a ruled surface machining path, comprising:
 a memory loaded with a plurality of executable instructions; and
 a processor for executing the plurality of executable instructions; the plurality of executable instructions comprise a method of executing the following steps:
 acquiring each target ruled surface in a three-dimensional diagram of a target workpiece to be machined, wherein the three-dimensional diagram of the target workpiece to be machined is used in a Computer Aided Manufacturing software;
 generating a mathematical model of each target ruled surface according to each target ruled surface;
 determining a current machining speed according to the mathematical model and preset machining process parameters;
 calculating machining path data corresponding to the target ruled surface according to the current machining speed;
 controlling the current machining speed according to the machining path data; and
 wherein the mathematical model comprises an upper edge curve mathematical model, a lower edge curve mathematical model, and a correlation function between an upper edge curve and a lower edge curve of the target ruled surface; wherein generating the mathematical model of each target ruled surface according to each target ruled surface further comprises:
 performing sorting and cutter compensation on each target ruled surface;
 identifying the upper edge curve and the lower edge curve of the target ruled surface for each target ruled surface; and
 constructing the upper edge curve mathematical model of the upper edge curve and the lower edge curve mathematical model of the lower edge curve.

18. A non-transitory readable storage medium, wherein when instructions in the storage medium are executed by a processor of a device for generating a ruled surface machining path, the device for generating the ruled surface machining path is enabled to execute the method for generating the ruled surface machining path comprising:
 acquiring each target ruled surface in a three-dimensional diagram of a target workpiece to be machined, wherein the three-dimensional diagram of the target workpiece to be machined is used in a Computer Aided Manufacturing software;

generating a mathematical model of each target ruled surface according to each target ruled surface;

determining a current machining speed according to the mathematical model and preset machining process parameters;

calculating machining path data corresponding to the target ruled surface according to the current machining speed;

controlling the current machining speed according to the machining path data; and wherein the mathematical model comprises an upper edge curve mathematical model, a lower edge curve mathematical model, and a correlation function between an upper edge curve and a lower edge curve of the target ruled surface; wherein generating the mathematical model of each target ruled surface according to each target ruled surface further comprises:

performing sorting and cutter compensation on each target ruled surface;

identifying the upper edge curve and the lower edge curve of the target ruled surface for each target ruled surface; and constructing the upper edge curve mathematical model of the upper edge curve and the lower edge curve mathematical model of the lower edge curve.

* * * * *

UNITED STATES PATENT AND TRADEMARK OFFICE
CERTIFICATE OF CORRECTION

PATENT NO. : 11,526,151 B2
APPLICATION NO. : 16/628599
DATED : December 13, 2022
INVENTOR(S) : Jiyue Zeng et al.

It is certified that error appears in the above-identified patent and that said Letters Patent is hereby corrected as shown below:

On the Title Page

Item (73):
The first Assignee reading "YANGTZE RIVER DELTA RESEARCH INSTITUTE OF NPU, Taicang (CN)" should be amended to read "YANGTZE RIVER DELTA RESEARCH INSTITUTE OF NPU, TAICANG, Taicang City (CN)".
The second Assignee reading "INSTITUTE OF NPU" needs to be deleted.

Signed and Sealed this
Twenty-fifth Day of April, 2023

Katherine Kelly Vidal
*Director of the United States Patent and Trademark Office*